United States Patent [19]

Hirai et al.

[11] Patent Number: 5,368,958
[45] Date of Patent: Nov. 29, 1994

[54] LITHIUM ANODE WITH CONDUCTIVE FOR AND ANODE TAB FOR RECHARGEABLE LITHIUM BATTERY

[75] Inventors: Toshiro Hirai; Jun-ichi Yamaki, both of Vancouver, Canada

[73] Assignee: Advanced Energy Technologies Incorporated, Burnaby, Canada

[21] Appl. No.: 932,593

[22] Filed: Aug. 20, 1992

[51] Int. Cl.$^5$ .................... H01M 4/02; H01M 4/58
[52] U.S. Cl. .................... 429/211; 429/218; 429/219; 429/220; 429/221; 429/222; 429/223; 429/224; 429/225; 429/226; 429/227; 429/228; 429/229; 429/230; 429/231
[58] Field of Search ............ 429/211, 218–231

[56] References Cited

U.S. PATENT DOCUMENTS

| | | |
|---|---|---|
| 4,375,501 | 3/1983 | Peled et al. . |
| 4,401,736 | 8/1983 | Zayatz ................................. 429/211 |
| 4,439,281 | 3/1984 | Schneider et al. ............... 429/211 X |
| 4,476,624 | 10/1984 | Klein et al. . |
| 4,482,615 | 11/1984 | Rosansky et al. ..................... 429/94 |
| 4,539,272 | 9/1985 | Goebel . |
| 4,604,333 | 8/1986 | Ikeda et al. . |
| 4,794,056 | 12/1988 | Pedicini ................................ 429/94 |
| 4,794,057 | 12/1988 | Griffin . |
| 4,863,815 | 9/1989 | Chang et al. . |
| 4,879,190 | 11/1989 | Lundsgaard . |
| 4,892,796 | 1/1990 | Chang et al. . |
| 4,902,589 | 2/1990 | Dahn et al. . |
| 4,937,154 | 6/1990 | Moses et al. . |
| 4,963,446 | 10/1990 | Roels et al. . |
| 4,969,254 | 11/1990 | Dahn et al. . |
| 5,017,442 | 5/1991 | Watanabe et al. . |
| 5,100,746 | 3/1992 | Muller et al. . |
| 5,147,739 | 9/1992 | Beard ................................. 429/194 |

Primary Examiner—Floyd D. Higel
Attorney, Agent, or Firm—Browdy and Neimark

[57] ABSTRACT

Lithium based electrical cells having a new anode electrode construction are described. The cells have a sandwich construction of lithium sheet, conductive foil and lithium sheet, wherein the anode tab is welded directly onto the conductive foil not onto the lithium. Alternatively, the tab is connected onto the lithium in an area where the lithium does not dissolve during discharge, so that the tab will not become disconnected from the anode sheet.

19 Claims, 3 Drawing Sheets

LITHIUM ANODE WITH CONDUCTIVE FOR AND ANODE TAB FOR RECHARGEABLE LITHIUM BATTERY

FIELD OF THE INVENTION

This invention relates to the use of an anode material sheet with a thin substrate as an anode electrode in rechargeable high energy density batteries, wherein the anode tab is connected at a point where the tab will not disconnect during charge/discharge cycling. More specifically, the anode is a sandwich construction of a lithium sheet, a conductive foil and a second lithium sheet, wherein the anode tab is welded directly onto the conductive foil and not onto the lithium. Alternatively, the tab is connected onto the lithium in an area where the lithium does not dissolve during discharge, so that the tab will not become disconnected from the anode sheet.

BACKGROUND OF THE INVENTION

Lithium rechargeable batteries are made from lithium metal and organic solvents, the combination of which causes fire at high temperature. The critical temperature depends on the type of batteries and the pre-cycling conditions. The lowest critical temperature is about 100° C. For this reason, cell heating from abnormal conditions has to be prevented. The safety of lithium rechargeable batteries thus continues to be a major problem to be solved.

Some lithium rechargeable batteries, known in the art, have anodes made from lithium metal sheet. However these cells demonstrate a sudden rising of temperature during cycling, which occasionally results in fire. Following disassembly of the cell, it has been found that non-uniform dissolution of lithium during discharge caused an anode cut to occur near the anode tab at the end of the anode. The anode area thus became very small, which caused local heating by increased current density. The local temperature became higher than the critical temperature, resulting in fire.

It is well known to construct a lithium anode with a substrate. For example, the Japanese patent from SONY Energy Teck. (toku-gan-hei 2-51875) discloses a lithium anode with a conductive substrate to increase cell capacity. However, a lithium anode with a conductive substrate cannot completely solve the problem. To avoid disconnection of the anode tab from the Li anode during cycling, the position of the anode tab must also be considered.

SUMMARY OF THE INVENTION

In the present invention disconnection of the anode tab is prevented by preparing a lithium anode with a substrate (for example copper foil) wherein the anode tab is welded directly onto the conductive foil and not onto the lithium. Alternatively, the anode tab is connected onto the lithium at a location where the lithium does not dissolve during discharge, so that the tab will not be disconnected from the anode sheet. The new anode, according to the present invention, when used in a rechargeable lithium battery, demonstrated excellent cell safety.

According to the present invention there is provided a lithium based electrical cell having a new anode electrode construction, which comprises a sandwich construction of a lithium sheet, a conductive foil and a second lithium sheet, wherein the anode tab is connected at a point where the tab will not disconnect during charge/discharge cycling.

According to the present invention the anode tab can be welded directly onto the conductive foil and not onto the lithium. Alternatively, the anode tab can be connected onto an area of the lithium where the lithium does not dissolve during discharge. One example of such an area is the outer side of a jelly roll construction where the lithium faces towards the can anode, with or without separator between them.

Thus according to the present invention, there is provided an anode suitable for use in a rechargeable lithium battery, wherein said anode comprises: a first and second lithium sheet; a conductive foil; wherein said conductive foil is positioned between the first and second lithium sheets, and an anode tab, wherein the anode tab is connected at a point where the tab will not disconnect during charge/discharge cycling.

Further according to the present invention there is provided an electrochemical cell comprising: an anode comprising a first and second lithium sheet; a conductive foil; wherein said conductive foil is positioned between the first and second lithium sheets, and an anode tab, which is connected at a point whereby to reduce lithium dissolution during discharge; a cathode; a non-aqueous electrolyte comprising a solvent and a lithium salt dissolved therein; and a porous separator.

DETAILED DESCRIPTION OF THE EMBODIMENTS

Figure 1:
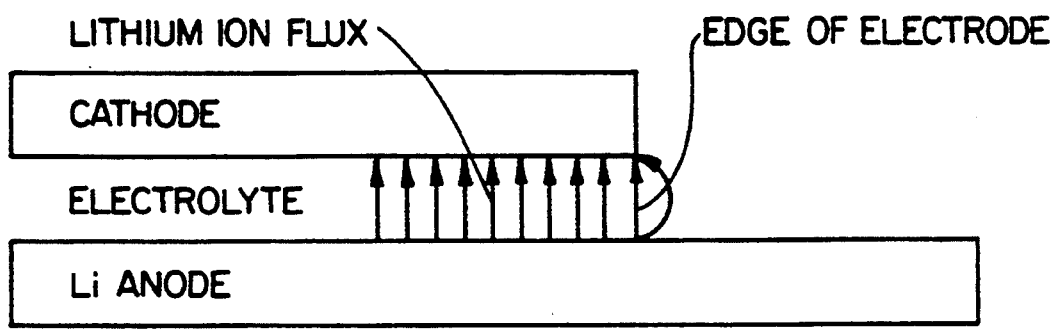
FIG. 1 shows the situation of edge effect.

The edge effect is shown in FIG. 1. As is known to persons skilled in the art, at the edge of the electrode greater current flows than at others parts of the electrode because ions can move outside of the electrode as shown in the FIG.

Figure 2:
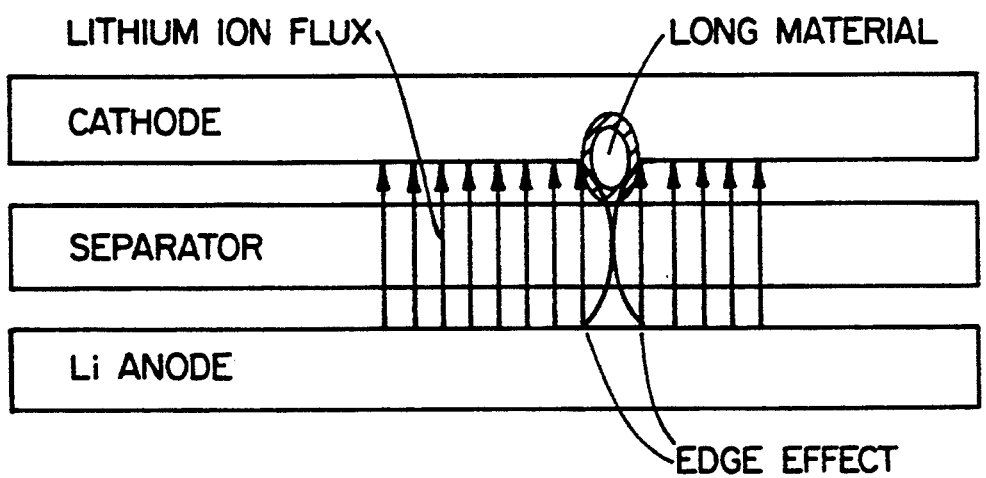
FIG. 2 shows the first case of an anode cut.
Figure 3:
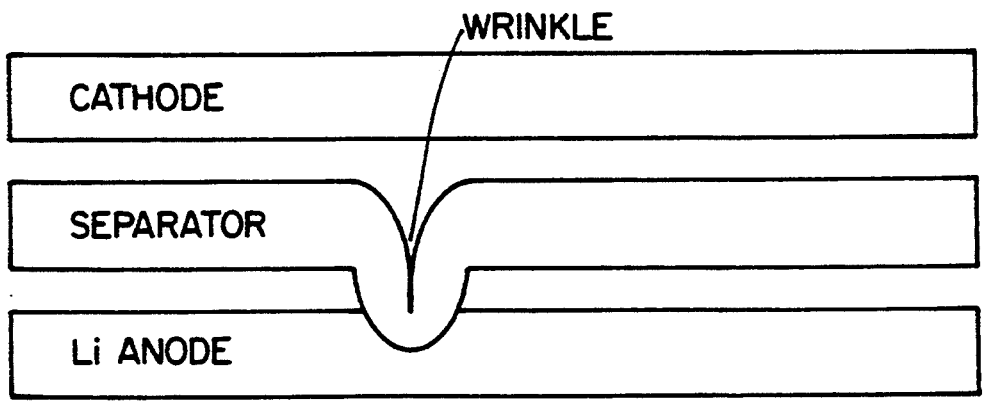
FIG. 3 shows the second case of an anode cut.
Figure 4:
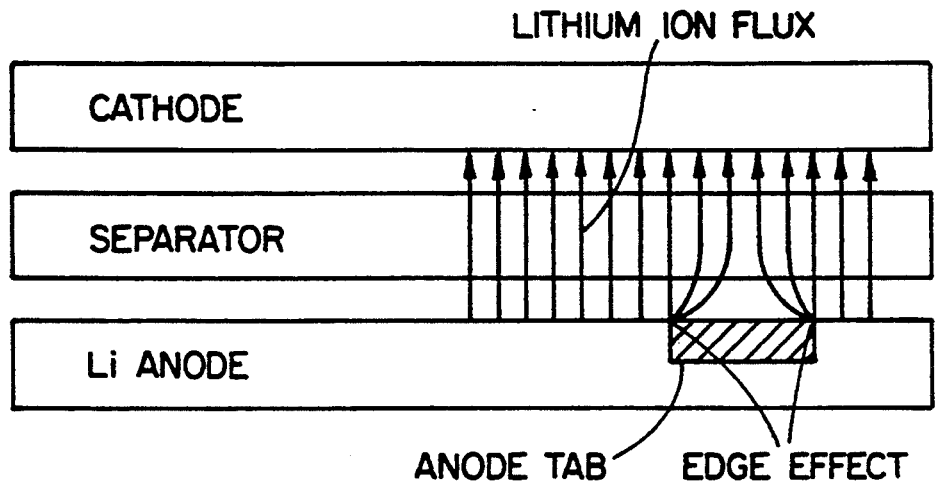
FIG. 4 shows the third case of an anode cut.

There are many reasons why a lithium anode, in a jelly roll battery construction, becomes cut. Some of theses reasons are described below:

1. Some thin and long material can be mixed across the jelly roll width. Due to the edge effect, the lithium along this material is consumed more than in other areas, so finally lithium anode becomes cut along the thin and long material (see FIG. 2).
2. Occasionally a wrinkle in the separator occurs during the winding of the electrodes. At the point of the wrinkle the stack pressure is high. Thus the lithium anode becomes thin at this area. Eventually, the lithium anode becomes cut along the wrinkle (see FIG. 3).
3. During cycling, and due to the edge effect, when the anode tab is on the lithium facing towards the cathode, the lithium along the anode tab becomes consumed more than in other areas. As a result, the lithium anode is cut along the anode tab (see FIG. 4).

Figure 5:
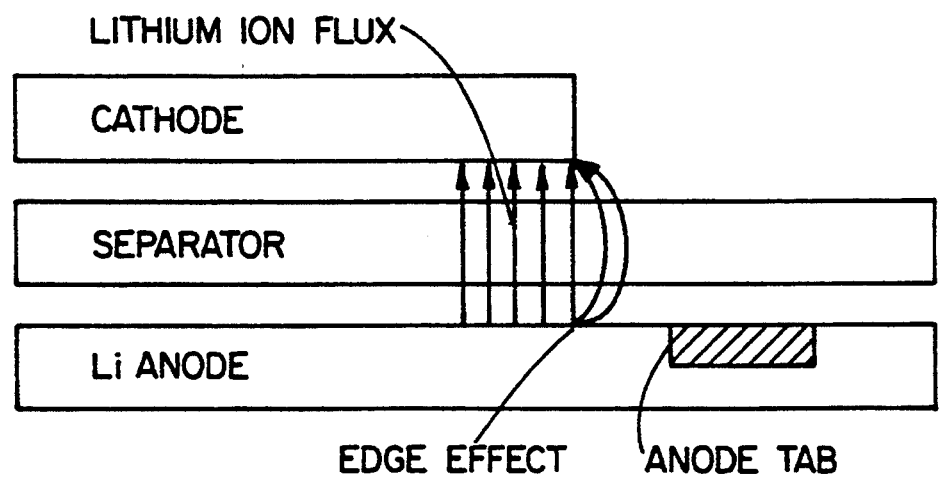
FIG. 5 shows the fourth case of an anode cut.

4. During cycling, in an example where the anode tab is on the lithium, not facing the cathode, but near the cathode end, the lithium along the end of cathode is consumed more than in other areas due to the edge effect. As a result the lithium anode becomes cut along the cathode end (FIG. 5).

Figure 6:
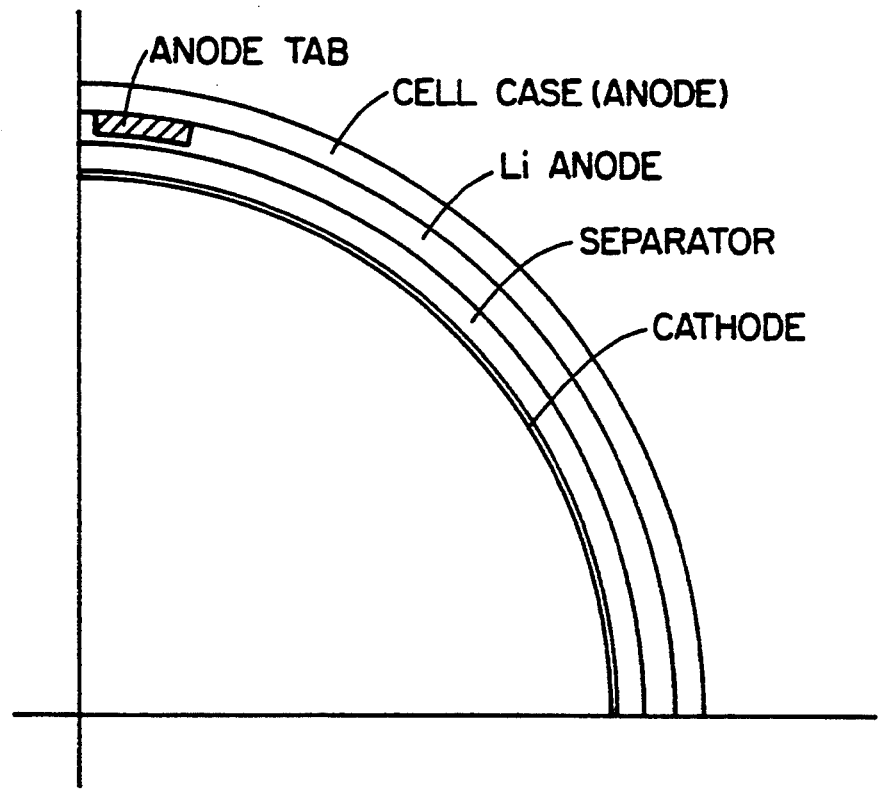
FIG. 6 shows one example of where the lithium anode tab is connected onto a lithium area in which the lithium does not dissolve during discharge.

To prevent anode cut, as in the case described in paragraph No. 3 above, this invention is directed to a special positioning of the anode tab. In one embodiment of the present invention the anode tab is welded directly onto the conductive foil and not onto the lithium. In another embodiment of the present invention the anode tab is connected to an area of the lithium where the lithium does not dissolve during discharge. One example of such an area is the outer side of the jelly roll construction where the lithium faces towards the can anode with or without separator between them, as shown in FIG. 6.

As noted above, when the lithium anode is cut in the prior art, the anode area becomes very small. This causes localized heating from increased current density. The local temperature becomes higher than the critical temperature, resulting in fire.

According to the present invention, anode cut can be prevented by the novel anode electrode construction. This anode comprises a sandwich construction of a lithium sheet, a conductive foil and a second lithium sheet. Even in the event of anode cut, from a cause as mentioned above, the conductive foil remains uncut because the anode potential is still the lithium dissolution potential at which potential the conductive foil does not dissolve.

In the case of galvanostatic forced discharge, as described in paragraph No. 4, as discussed above, the firing occurs following negative overpotential of the cell (negative voltage). When the new anode of the present invention is used, such firing does not occur. However, if the forced discharge is continued after the occurrence of negative voltage, the lithium on the anode is plated on the cathode because the cathode material has already completely reacted with the lithium. Thus, the amount of lithium on the conductive foil is reduced. This reduction increases the over potential on the lithium electrode. Finally, the over potential becomes large enough for the anode potential to become the dissolution potential of the conductive foil. This results in an anode cut. At this time, the voltage is negative. However, the new anode does not dissolve during cycling above 0 volts. It is necessary to prolong the time of anode dissolution since the beginning of forced discharge. When the dissolution potential is high, the anode foil is difficult to dissolve. Thus it is recommended that the difference in dissolution potential between lithium and foil be larger than 1 volt. The dissolution potential of Li is $-3.03$ V vs standard hydrogen electrode. Therefore, it is preferred that the metal in the foil has a dissolution potential greater than $-2.03$ V.

In one example of the present invention, metal or alloy foil is coated with a layer of ionically non-conductive but electrically conductive material or composites. The coated foil does not dissolve, even at very high potential, and thus it is a suitable material for the present invention.

According to the present invention the conductive foil is selected from: metal, alloy or composite foil which has a higher dissolution potential in the electrolyte used in the cell than that of lithium; metal, alloy or composite foil with coating of ionically non-conductive but electrically conductive material or composites; or metal, alloy or composite mesh which has a higher dissolution potential in the electrolyte used in the cell than that of lithium. As noted above, it is preferred that the dissolution potential of the metal in the foil is greater than $-2.03$ V.

The metal, alloy or composite foil or mesh can be fabricated for example from either Cr, Cu, Au, Ag, Al, In, Fe, Pb, Mn, Zn, Cd, Tl, Co, Ni or Sn as the metal or an alloy whose main component is Cr, Cu, Au, Ag, Al, In, Fe, Pb, Mn, Zn, Cd, Tl, Co, Ni or Sn or a composite whose main component is Ca, Cr, Cu, Au, Ag, Al, In, Fe, Pb, Mn, Zn, Cd, Tl, Co, Ni or Sn. Preferably, the difference of the dissolution potential is larger than 1 Volt and the thickness of the foil or mesh is from 5 $\mu$m to 500 $\mu$m.

The coating material is preferably a mixture of carbon powder and polymer binder solution. After the coating material is dried on the conductive foil, it has to have electrical conductivity. Thus, the volume percent of the carbon is preferably larger than 10%. Examples of suitable polymer binders include: polyacrylic acid, polyacrylonitrile, polyamide, polyester, polyethylene glycol, polyethylene oxide, polyoxymethylene, polystyrene, polysulfide rubber, polyvinylalcohol, polyvinylpyrrolidone and polyvinyl chloride.

Preferably, the total thickness of metal, alloy or composite foil and the coating is from 5 $\mu$m to 500 $\mu$m.

The anode active material used in the novel anode of the present invention is selected from the group consisting of lithium; lithium ion dischargeable lithium alloys, such as Li—Al or Li—Si alloys; lithium ion dischargeable intercalation or insertion compounds, such as various kinds of carbon materials, polyacenic semiconductors, and metal chalogenides, such as lithium tungsten oxides and niobium oxide. Preferred anode active materials have an electrochemical potential close to that of pure Li, which can avoid the serious decrease in the cell voltage, and a high capacity of capturing or holding Li$^+$ ions and of discharging Li + ions, which can avoid the serious decrease in the capacity, compared with pure lithium.

The lithium anode, made according to this invention, can be used in lithium based-electrochemical cells without modifying the cell's remaining elements, such as the cathode, separator, and electrolyte. These elements have been described in the literature directed to lithium rechargeable batteries.

The electrolyte is generally a non-aqueous electrolyte comprising a solvent and a lithium salt dissolved therein. The solvent is preferably selected from: ethers, esters, dioxolanes, furans and glymes such as propylenecarbonate, ethylene carbonate or monoglyme. The lithium salt generally has an anion selected from halide ions, hexafluorometallate ions, tetrafluorometallate ions, perchlorate ions, sulfonate ions, borate ions, thiocyanate ions, aluminate ions, closoborane ions and derivatives thereof.

The cathode active material used in lithium based electrical cell of this invention is a chalcogen or chalcogenide compound of a transition metal or lithiated compounds of these materials such as lithiated $MOS_2$ or $TiS_2$. Furthermore, the cathode is selected from a substance selected from a halogen, a halide, a metal oxide, a sulphide, a selenide, an oxyhalide, sulfur dioxide and carbon or lithiated compounds of these materials such as amorphous $V_2O_5$, lithiated $MnO_2$, $LiNiO_2$, $LiCoO_2$, or $LiCo_xNi_{(1-x)}O_2$.

The separator can be made of polymer materials, such as polyethylene and polypropylene or a glass microfiber material in the form of a microporous film.

The following examples illustrate various embodiments of the present invention, but are not to be construed as limiting.

EXAMPLES

EXAMPLE 1

Copper conductive foil

Figure 7:
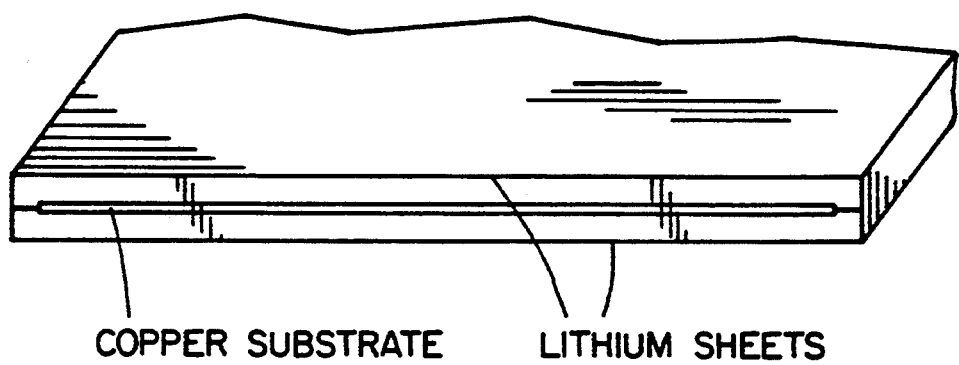
FIG. 7 shows one example of lithium anode with the substrate.

Copper foil with a thickness of 9 μm and a width of 40 mm was used as the conductive foil. Lithium sheets (63.5 μm thick) were put on both sides of the copper foil. The lithium sheet was 2 mm wider than that of the copper foil and therefore the copper foil essentially covers all or essentially the area of the lithium sheets. As shown in FIG. 7, the copper foil is maintained in position between the lithium sheets by a lithium to lithium adhesion at the edge of the anode. The adhesion strength of lithium on lithium is stronger than lithium on copper.

A jelly roll construction for an AA cell was made using the new anode, a cathode sheet (the active material was amorphous $V_2O_5$), and a polyethylene separator (E002 by 3M). Organic electrolyte was composed of propylenecarbonate, ethylenecarbonate and $LiAsF_6$.

The anode tab to be connected onto the can was welded onto the copper foil.

After 25 cyclings at 40 mA charge up to 3.3 V and 80 mA discharge down to 1.5 V, the cell stopped cycling at a fully charged state.

The cell was force discharged at a constant current of 3 A and maximum voltage of −10 V at 40° C. There was no venting even after 18 hours.

As a control, the same cell as described above was made except the anode was a 127 μm thick lithium sheet without copper foil. The anode tab was welded directly onto the lithium sheet. The same pre-cycling and forced discharge were done, as described above. The control cell had venting with fire.

EXAMPLE 2

The same cell as in Example 1 was made but the anode had a conductive foil, which was a copper foil with a surface coating of a composite made of carbon and polymer binder. The coating was made by mixing and ball milling overnight a composition of carbon powder - acetylene black (6 g); polyacrylic acid −25% water based solution (8 g) and methyl alcohol (160 cc). The copper foil (9 μm) was coated on both sides with a 5 μm layer of the coating material, to give an overall thickness of the coated foil of about 19 μm. The anode tab was welded onto the conductive foil.

The same pre-cycling and forced discharge as described in Example 1 were done in this Example. The cell did not have any venting with fire.

EXAMPLE 3

The same cell as described in Example 1 was made but the anode was connected to the lithium at a position where the lithium did not face the anode as shown in FIG. 6. The same pre-cycling and forced discharge as Example 1 were done. The cell did not have any venting with fire.

As shown in examples, a very safe cell using the said new anode. The improved cell can be used for portable equipment and other electric devices for a lithium rechargeable battery has very high energy density.

Although preferred embodiments of the invention are described herein in detail, it will be understood by those skilled in the art that variations may be made thereto without departing from the spirit of the invention or the scope of the appended claims.

What we claim is:

1. An anode suitable for use in a rechargeable lithium battery, wherein said anode comprises:
   a first lithium sheet and second lithium sheet;
   a conductive foil positioned between said first lithium sheet and said second lithium sheet, said conductive foil essentially covering all or essentially the area of the lithium sheets; and
   an anode tab, wherein said anode tab is connected at a point where the tab will not disconnect during charge/discharge cycling.

2. The anode of claim 1, wherein the anode tab is connected onto the conductive foil.

3. The anode of claim 1, wherein the anode tab is connected onto a lithium area where the lithium does not dissolve during discharge.

4. The anode of claim 1, wherein the conductive foil is selected from the group consisting of metal, metal alloy and a metal composite foil, wherein said conductive foil, when in use in a electrolytic cell, has a higher dissolution potential than that of lithium.

5. The anode of claim 4, wherein the conductive foil has a higher dissolution potential than −2.03 V.

6. The anode of claim 5, wherein the metal is selected from the group consisting of: Cr, Cu, Au, Ag, Al, In, Fe, Pb, Mn, Zn, Cd, Tl, Co, Ni and Sn.

7. The anode of claim 4, wherein the main component of the metal alloy and metal composite is selected from the group consisting of: Cr, Cu, Au, Ag, Al, In, Fe, Pb, Mn, Zn, Cd, Tl, Co, Ni and Sn.

8. The anode of claim 4, wherein the difference of the dissolution potential is larger than 1 Volt.

9. The anode of claim 1, wherein the conductive foil is from about 5 μm to about 500 μm thick.

10. The anode of claim 1, wherein the conductive foil is coated with an ionically non-conductive but electrically conductive material or composites.

11. The anode of claim 10, wherein the coating material is a mixture of a carbon powder and a polymer binder solution.

12. An anode for a rechargeable lithium battery, comprising:
   a first lithium sheet and a second lithium sheet each having a surface area;
   a conductive foil positioned between said first lithium sheet and said second lithium sheet, said conductive foil covering essentially all the surface area of said first lithium sheet and said second lithium sheet except for a narrow edge area whereby said first lithium sheet and said second lithium sheet are in direct contact with one another over said narrow edge area, said conductive foil having a higher dissolution potential than −2.03 V and being selected from the group consisting of metal, metal alloy and metal composite foil; and
   an anode tab welded directly onto said conductive foil.

13. The anode of claim 12, wherein the metal is selected from the group consisting of: Cr, Cu, Au, Ag, Al, In, Fe, Pb, Mn, Zn, Cd, Tl, Co, Ni and Sn.

14. The anode of claim 12, wherein the main component of the metal alloy and metal composite is selected from the group consisting of: Cr, Cu, Au, Ag, Al, In, Fe, Pb, Mn, Zn, Cd, Tl, Co, Ni and Sn.

15. The anode of claim 12, wherein the conductive foil is coated with an ionically non-conductive but electrically conductive material or composite.

16. An anode for a rechargeable lithium battery, comprising:
- a first lithium sheet and a second lithium sheet each having a surface area;
- a conductive foil positioned between said first lithium sheet and said second lithium sheet, said conductive foil covering essentially all the surface area of said first lithium sheet and said second lithium sheet except for a narrow edge area whereby said first lithium sheet and said second lithium sheet are in direct contact with one another over said narrow edge area, said conductive foil having a higher dissolution potential than $-2.03$ V and being selected from the group consisting of metal, metal alloy and metal composite foil; and
- an anode tab welded directly onto the lithium in an area where the lithium does not dissolve during charge/discharge cycling.

17. The anode of claim 16, wherein the metal is selected from the group consisting of: Cr, Cu, Au, Ag, Al, In, Fe, Pb, Zn, Cd, Tl, Co, Ni and Sn.

18. The anode of claim 16, wherein the main component of the metal alloy and metal composite is selected from the group consisting of: Cr, Cu, Au, Ag, Al, In, Fe, Pb, Mn, Zn, Cd, Tl, Co, Ni and Sn.

19. The anode of claim 16, wherein the conductive foil is coated with an ionically non-conductive but electrically conductive material or composite.

* * * * *

UNITED STATES PATENT AND TRADEMARK OFFICE
CERTIFICATE OF CORRECTION

PATENT NO. : 5,368,958
DATED : November 29, 1994
INVENTOR(S) : HIRAI et al

It is certified that error appears in the above-indentified patent and that said Letters Patent is hereby corrected as shown below:

On the Title page, item [54], second line, and col. 1 line 1, change "For" (first occurrence) to --Foil--.

Signed and Sealed this

Thirteenth Day of June, 1995

Attest:

BRUCE LEHMAN

Attesting Officer     Commissioner of Patents and Trademarks